US012315674B2

(12) United States Patent
Zhang

(10) Patent No.: US 12,315,674 B2
(45) Date of Patent: May 27, 2025

(54) FERROFLUID CONTROL DEVICE

(71) Applicant: Chunjie Zhang, Guangzhou (CN)

(72) Inventor: Chunjie Zhang, Guangzhou (CN)

( * ) Notice: Subject to any disclaimer, the term of this patent is extended or adjusted under 35 U.S.C. 154(b) by 292 days.

(21) Appl. No.: 18/297,611

(22) Filed: Apr. 8, 2023

(65) Prior Publication Data

US 2024/0312686 A1 Sep. 19, 2024

(30) Foreign Application Priority Data

Mar. 13, 2023 (CN) ........................ 202310234839.0

(51) Int. Cl.
*H01F 7/20* (2006.01)
*H01F 1/44* (2006.01)

(52) U.S. Cl.
CPC ................ *H01F 7/20* (2013.01); *H01F 1/44* (2013.01)

(58) Field of Classification Search
CPC ... H01F 7/20; H01F 1/44; H01F 1/447; B01F 33/45
See application file for complete search history.

(56) References Cited

U.S. PATENT DOCUMENTS 6,628,017 B1 * 9/2003 Chass .................... H02K 35/06 310/11
2006/0071973 A1 * 4/2006 Peeters ................ B01L 3/0268 347/54
2017/0135683 A1 * 5/2017 Waller ............ A61B 17/00491
2021/0331816 A1 * 10/2021 Ehresmann ............ B64G 1/244
2023/0161185 A1 * 5/2023 Jeong ...................... G02F 1/092 359/280

* cited by examiner

*Primary Examiner* — Bernard Rojas
(74) *Attorney, Agent, or Firm* — JEEN IP LAW, LLC

(57) ABSTRACT

The present application relates to a ferrofluid control device, which generates two different magnetic fields by placing the first magnetic conductor and the second magnetic conductor at different positions of the first coil group, thereby enabling the ferrofluid to produce more abundant dancing effects. Furthermore, a richer dancing effect can be realized by adding the second coil group and the third magnetic conductor.

7 Claims, 2 Drawing Sheets

FERROFLUID CONTROL DEVICE

CROSS-REFERENCE TO RELATED APPLICATIONS

This is a U.S. patent application which claims the priority and benefit of Chinese Patent Application Number 202310234839.0, filed on Mar. 13, 2023, the disclosure of which is incorporated herein by reference in its entirety.

TECHNICAL FIELD

The present application relates to the technical field of ferrofluid control, in particular to a ferrofluid control device.

BACKGROUND

Ferrofluid is a flowing liquid composed of nano-scale magnetic solid particles, base carrier liquid and surfactant. Ferrofluid is a flowing liquid that can be controlled by magnetic force. The current ferrofluid control devices are all controlled by the cooperation of a single coil and a magnetic conductor, so as to show the dancing effect caused by the magnetic field, and it is installed on various electronic products such as audio, earphones, toys, and clocks. It also succeeded in attracting people's interest. However, the control function of ferrofluid in the prior art is relatively single, and richer dancing effects cannot be achieved. The reason is that in the prior art, only a single coil generates a magnetic field, and the dancing change is realized by controlling the voltage and frequency output of the circuit.

SUMMARY

The technical problem to be solved in the present application is to provide a ferrofluid control device for the above-mentioned deficiencies in the prior art.

The embodiment of the present application provides a ferrofluid control device, comprising a first coil group, having a first magnetic conductor arranged in a hollow hole of the first coil group and coupled with the first coil group; a circuit control board, configured to provide voltage and be electrically connected to the first coil group; a container, configured to store ferrofluid, and arranged on one end surface of the first coil group; and a second magnetic conductor arranged on other end surface of the first coil and coupled with the first coil group.

In some of these embodiments, it further comprises at least one second coil group electrically connected to the circuit control board, the second coil group is arranged on outer periphery of the first coil group, and a third magnetic conductor is arranged in the hollow hole of the second coil group and coupled with the second coil group, the second coil group is coupled to the second magnetic conductor.

In some of these embodiments, the outer periphery of the first coil group is provided with a bracket, and the bracket has at least one mounting hole for assembling the second coil group.

In some of these embodiments, the second magnetic conductor is locked on the bracket.

In some of these embodiments, the bracket has a slot for accommodating the second magnetic conductor.

In some of these embodiments, the second coil group is fixedly passed through the mounting hole and is fixedly assembled with the second magnetic conductor.

In some of these embodiments, the control board is locked on the bracket.

In some of these embodiments, the material of the first magnetic conductor, the second magnetic conductor and the third magnetic conductor is iron.

In some of these embodiments, the circuit control board is configured to provide pulse voltage.

Compared with the related technology, the ferrofluid control device provided in the embodiment of the present application generates two different magnetic fields by placing the first magnetic conductor and the second magnetic conductor at different positions of the first coil group, thereby enabling the ferrofluid to produce more abundant dancing effects. Furthermore, a richer dancing effect can be realized by adding the second coil group and the third magnetic conductor.

The details of one or more embodiments of the present application are set forth in the accompanying drawings and the description below, so as to make other features, objects, and advantages of the present application more comprehensible.

BRIEF DESCRIPTION OF DRAWINGS

The drawings described here are used to provide a further understanding of the application and constitute a part of the application. The schematic embodiments and descriptions of the application are used to explain the application and do not constitute an improper limitation to the application. In the attached drawings.

Figure 1:
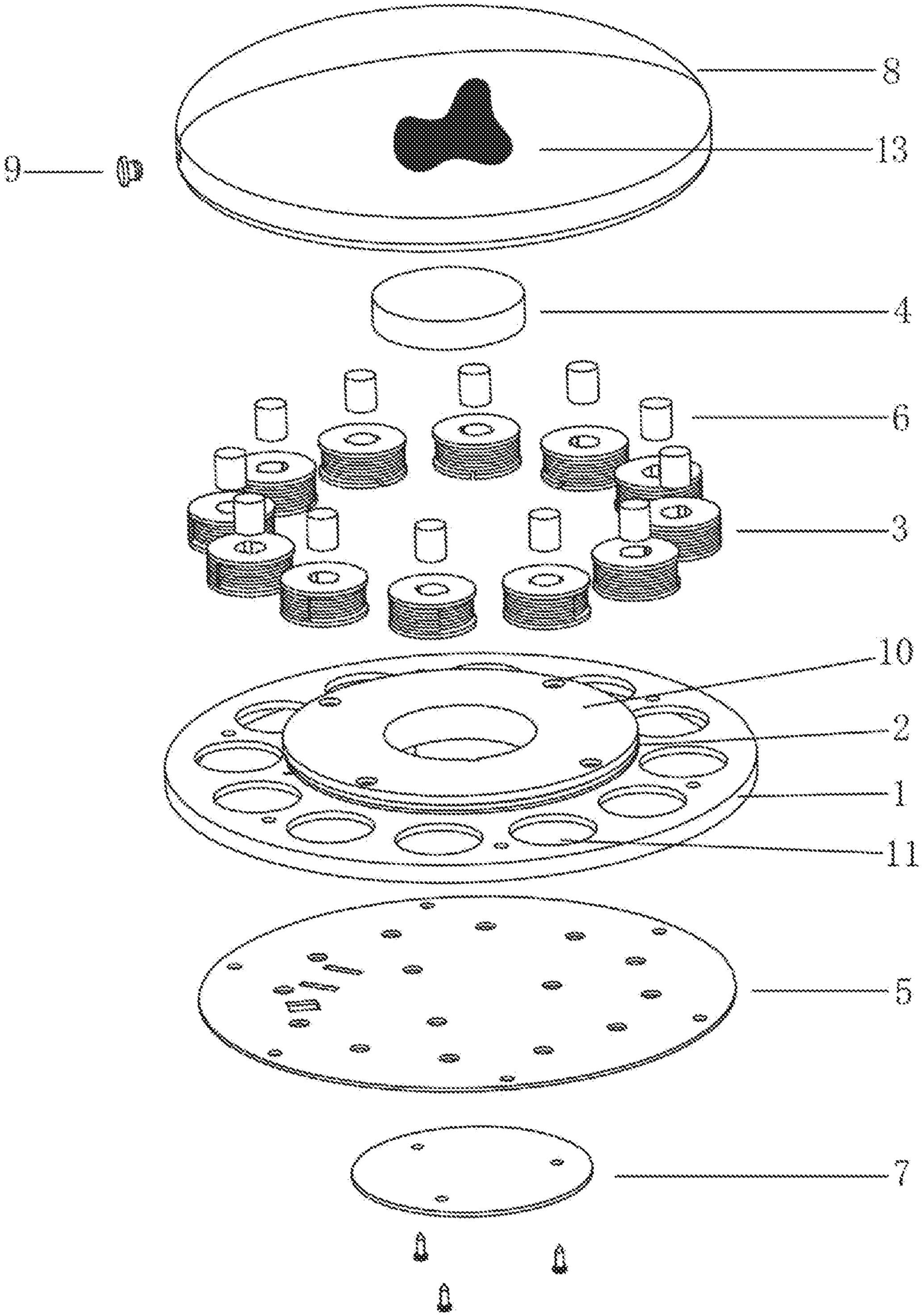
FIG. 1 is an exploded structure diagram of a ferrofluid control device according to an embodiment of the present application.

Reference signs: 1. Bracket; 2. First coil group; 3. Second coil group; 4. First magnetic conductor; 5. Second magnetic conductor; 6. Third magnetic conductor; 7. Circuit control board; 8. Container; 9. Rubber plug; 10. First coil frame; 11. Mounting hole; 12. Slot; 13. ferrofluid.

DETAILED DESCRIPTION

In order to make the purpose, technical solutions and advantages of the present application clearer, the present application will be described and illustrated below in conjunction with the accompanying drawings and embodiments. It should be understood that the specific embodiments described here are only used to explain the present application, and are not intended to limit the present application. Based on the embodiments provided in the present application, all other embodiments obtained by persons of ordinary skill in the art without creative efforts shall fall within the protection scope of the present application. In addition, it can also be understood that although such development efforts may be complex and lengthy, for those of ordinary skill in the art related to the content disclosed in this application, some design, manufacturing or production changes based on the technical content disclosed in this application are just conventional technical means and should not be understood that the content disclosed in this application is not sufficient.

Reference in the present application to an "embodiment" means that a particular feature, structure, or characteristic described in connection with the embodiment can be included in at least one embodiment of the present application. The occurrences of this phrase in various places in the specification are not necessarily all referring to the same embodiment, nor are separate or alternative embodiments mutually exclusive of other embodiments. It is understood explicitly and implicitly by those of ordinary skill in the art that the embodiments described in this application can be combined with other embodiments without conflict.

Unless otherwise defined, the technical terms or scientific terms involved in the application shall have the usual meanings understood by those with ordinary skill in the technical field to which the application belongs. Words such as "a", "an", "an" and "the" involved in this application do not indicate a limitation on quantity, and may indicate singular or plural numbers. The terms "comprises", "comprising", "having" and any variations thereof in the application are intended to cover non-exclusive inclusion. For example, a process, method, system, product or device that includes a series of steps or modules (units) is not limited to the listed steps or units, but may also include steps or units that are not listed, or may also include other steps or units inherent in these processes, methods, products or apparatus. The words "connected", "connecting", "coupled" and similar words mentioned in this application are not limited to physical or mechanical connection, but may include electrical connection, no matter it is direct or indirect. "A plurality of" referred to in the present application means greater than or equal to two. "And/or" describes the association relationship of associated objects, indicating that there may be three types of relationships. For example, "A and/or B" may indicate: A exists alone, A and B exist simultaneously, and B exists alone. The terms "first", "second", "third" and the like involved in this application are only used to distinguish similar objects, and do not represent a specific ordering of objects.

Figure 2:
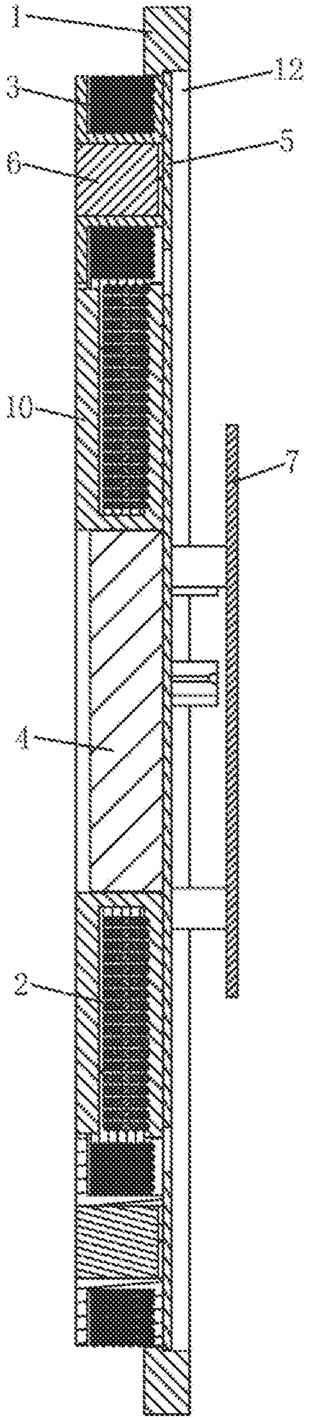
FIG. 2 is an assembled sectional view of the ferrofluid control device according to the embodiment of the present application.

As shown in FIGS. 1-2, the ferrofluid control device provided by the embodiment of the present application comprises a control assembly composed of a bracket 1, a first coil group 2, a second coil group 3, a first magnetic conductor 4, a second magnetic conductor 5, a third magnetic conductor 6 and a circuit control board 7, and a container 8. The container 8 is used to store ferrofluid 13, and the ferrofluid is a flowing liquid formed by mixing nano-scale magnetic solid particles, a carrier liquid and a surfactant. A ferrofluid is a flowing fluid that can be controlled by magnetism. The circuit control board 7 is welded with the first coil group 2 and the second coil group 3 to realize electrical connection, and is used to provide voltage to the first coil group 2 and the second coil group 3, and can output pulse voltage and control frequency to realize the change of different magnetic field and realize rich dancing effect.

The container 8 of this embodiment is provided with a liquid injection port, and the liquid injection port can be blocked and sealed by a rubber plug 9, and the ferrofluid 13 can be injected into the container 8 through the liquid injection port.

The first coil set 2 in this embodiment is composed of a first coil frame 10 and copper wires wound on the first coil frame 10. The first magnetic conductor 4 is placed in the hollow hole of the first coil frame 10 to couple with the first coil group 2. The lower periphery of the first coil frame 10 is integrally formed with the above-mentioned annular bracket 1. The top surface of the bracket 1 is provided with a plurality of mounting holes 11 at equal intervals along the circumference, and the mounting holes 11 are used for inserting and limiting the second coil group 3. The second coil group 3 is composed of a second coil frame and copper wires wound on the second coil frame. The third magnetic conductor 6 is placed in the hollow hole of the second coil frame and coupled with the second coil group 3. After the second coil group 3 is assembled on the bracket 1, the top surface of the second coil group 3 is flush with the top surface of the first coil group 2 and close to the bottom surface of the container 8. The bottom surface of the bracket 1 has a circumferential convex edge to form a slot 12, which is used to embed the disc-shaped second magnetic conductor 5, and the second coil group 3 and the second magnetic conductor 5 are locked by screws. Although the second magnetic conductor 5 is arranged outside the hollow holes of the first coil group 2 and the second coil group 3, after the first coil group 2 and the second coil group 3 are energized, the second magnetic conductor 5 will still be generate a magnetic field. Therefore, the second magnetic conductor 5 is coupled with the first coil group 2, and the second magnetic conductor 5 is coupled with the second coil group 3. In this embodiment, "coupling" refers to the effect of forming a magnetic field on the magnetic conductor after the coil is energized.

The material of the first magnetic conductor 4, the second magnetic conductor 5 and the third magnetic conductor 6 in this embodiment is iron.

In this embodiment, the 12 second coil groups 3 are located on the outer periphery of the first coil group 2 and are located on the bottom surface of the container 8 as a whole, forming a device for controlling the ferrofluid by the magnetic fields of multiple coil groups. In another embodiment, only the magnetic field generated by the first coil group 2 to the first magnetic conductor 4 and the second magnetic conductor 5 constitutes a device for controlling the ferrofluid with a single coil magnetic field.

The working principle of the embodiment of this application:

Principle of ferrofluid control by magnetic fields of multiple coil groups: When the circuit control board is energized, pulse voltages will be sent to each coil group (the first coil group and the second coil group). When all the coil groups are energized, the copper wire of the coil group will generate magnetic force lines, and the magnetic force lines will pass through the iron block in the middle of the coil group (the first magnetic conductor, the third magnetic conductor), the iron block magnetically collects the magnetic force, and the copper wire group and the middle iron block (the first magnetic conductor, the third magnetic conductor) are combined to form a magnetic force group. The synchronous hardware iron plate (the second magnetic conductor) collects the magnetic force lines, and the magnetic force lines form another set of magnetic fields, which are added to the magnetic fields formed by the coil group to form a strong magnetic field. After the ferrofluid in the container is subjected to magnetic force, it will be attracted by the direction of the magnetic force and swim. By changing the power-on and power-off cycle control of different coil groups, the magnetic force will follow the power-on of the coil group to move, and the ferrofluid will follow the magnetic force to change its position, thus producing a ferrofluid swimming and dancing animation. By controlling the frequency change and voltage change of the circuit output, the power-on and power-off actions of different coil groups, different ferrofluid flows are formed, and the speed and frequency of the flow change with the control changes of the circuit, so as to realize the required dancing picture and achieve the purpose of visual needs.

The principle of ferrofluid control by the magnetic field of a single coil group: When the circuit control board is energized, it will send a pulse voltage to the coil group (the first coil group). When the coil group is energized, the copper wire of the coil group will generate magnetic force lines, and the magnetic force lines will pass through the iron block in the middle of the coil group (the first magnetic conductor). The iron block is magnetically conductive to collect magnetic force, and the copper wire group and the middle iron block are combined to form a magnetic force group. The synchronous hardware iron plate (the second magnetic conductor) collects the magnetic force lines, and the magnetic force lines form another set of magnetic fields, which are added to the magnetic fields formed by the coil group to form a strong magnetic field. After the magnetic liquid in the container is subjected to the magnetic force, it will swim in the water by the suction force in the direction of the magnetic force. By changing the power-on and power-off cycle control of the wire group, the magnetic force will follow the coil group to move when the coil group is energized, and the magnetic liquid will follow the magnetic force to change its position. When the current passes through the copper wire, a reverse electromotive force will be generated at the same time to generate a secondary magnetic force line, and the suction force will also drive the ferrofluid to be pushed, thus creating a picture of the ferrofluid swimming and dancing. By controlling the frequency change and voltage change of the circuit output, the power-on and power-off actions of different coil groups, different ferrofluid flows are formed, and the speed and frequency of the flow change with the control changes of the circuit, so as to realize the required dancing picture and achieve the purpose of visual needs.

This embodiment can be integrated into specific products to form liquid dance audio, liquid dance earphones, liquid dance toys, liquid dance clocks, etc., which have a wide range of applications.

Those skilled in the art should understand that the various technical features of the above-mentioned embodiments can be combined arbitrarily, and for the sake of concise description, all possible combinations of the various technical features in the above-mentioned embodiments are not described. However, as long as there is no contradiction in the combination of these technical features, it should be considered as within the scope of the description.

The above-mentioned embodiments only express several implementation modes of the present application, and the description thereof is relatively specific and detailed, but should not be construed as limiting the scope of the patent application. It should be noted that those skilled in the art can make several modifications and improvements without departing from the concept of the present application, and these all belong to the protection scope of the present application. Therefore, the scope of protection of the patent application should be based on the appended claims.

What is claimed is:

1. A ferrofluid control device, comprising:

a first coil group, having a first magnetic conductor arranged in a hollow hole of the first coil group and coupled with the first coil group;

a circuit control board, configured to provide voltage and be electrically connected to the first coil group;

a container, configured to store ferrofluid, and arranged on one end surface of the first coil group; and a second magnetic conductor, arranged on other end surface of the first coil and coupled with the first coil group;

wherein the ferrofluid control device further comprises at least one second coil group electrically connected to the circuit control board, the second coil group is arranged on an outer periphery of the first coil group, and a third magnetic conductor is arranged in a hollow hole of the second coil group and coupled with the second coil group, the second coil group is coupled to the second magnetic conductor;

the outer periphery of the first coil group is provided with a bracket, and the bracket has at least one mounting hole for assembling the second coil group.

2. The ferrofluid control device according to claim 1, wherein the second magnetic conductor is locked on the bracket.

3. The ferrofluid control device according to claim 1, wherein the bracket has a slot for accommodating the second magnetic conductor.

4. The ferrofluid control device according to claim 2, wherein the second coil group is fixedly passed through the mounting hole and is fixedly assembled with the second magnetic conductor.

5. The ferrofluid control device according to claim 1, wherein the circuit control board is locked on the bracket.

6. The ferrofluid control device according to claim 1, wherein the material of the first magnetic conductor, the second magnetic conductor and the third magnetic conductor is iron.

7. The ferrofluid control device according to claim 1, wherein the circuit control board is configured to provide pulse voltage.

* * * * *